United States Patent
Hsiao

(10) Patent No.: US 7,484,977 B2
(45) Date of Patent: Feb. 3, 2009

(54) ELECTRICAL CARD CONNECTOR WITH LOCK DEVICE

(75) Inventor: Hsueh-Lung Hsiao, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/006,395

(22) Filed: Jan. 2, 2008

(65) Prior Publication Data

US 2008/0160808 A1 Jul. 3, 2008

(30) Foreign Application Priority Data

Jan. 2, 2007 (TW) ............................. 96200055 U

(51) Int. Cl.
*H01R 13/62* (2006.01)

(52) U.S. Cl. ........................ 439/160; 439/630

(58) Field of Classification Search ......... 439/157–160, 439/630–632
See application file for complete search history.

(56) References Cited

U.S. PATENT DOCUMENTS

| 6,899,555 | B2 | 5/2005 | Nagata et al. | |
|---|---|---|---|---|
| 7,070,451 | B2 | 7/2006 | Nagata et al. | |
| 2008/0160808 | A1* | 7/2008 | Hsiao | 439/160 |
| 2008/0160829 | A1* | 7/2008 | Hsiao | 439/607 |
| 2008/0194148 | A1* | 8/2008 | Hsiao | 439/630 |

* cited by examiner

*Primary Examiner*—James Harvey
(74) *Attorney, Agent, or Firm*—Wei Te Chung

(57) ABSTRACT

The present invention relates to an electrical card connector (100), comprising an insulative housing (1), a plurality of terminals (3) receiving by the insulative housing (1), a shell (2) covering the insulative housing (1), an eject mechanism (4) assembled on one side of the insulative housing (1) for ejecting an electrical card. The insulative housing (1) and shell (3) define a receiving space (10) for accepting the electrical card. Said the ejector mechanism (4) comprises a locking device (44). Said locking device (44) comprises a locking member (440) with two flexible arms (441) connecting to the slider (40) in a front-to-rear direction. Said flexible arms (441) assume a step-shaped distribution.

14 Claims, 5 Drawing Sheets

ELECTRICAL CARD CONNECTOR WITH LOCK DEVICE

BACKGROUND OF THE INVENTION

1. Field of the Invention

The present invention generally relates to an electrical card connector, and more specially to an electrical card connector with a lock device.

2. Description of Prior Art

Usually, electronic device such as digital camera and PDA deploys an electrical card for increasing the storage of the device. The electrical card connector is used for connecting the electrical card to the electronic device. Electrical card connector in early stage just comprises an insulative housing and a plurality of terminals for contacting with an electrical card, and a part of the electrical card exposes to the outside of the connector for ejecting itself conveniently. Indeed, some electrical card connector include an ejecting mechanism. When user needs to eject a card from the connector, he just pushes the card again. Some electrical card connector have a lock device for holding the card in the connector and avoiding the electrical card from drawing out of the connector by mistake.

U.S. Pat. No. 6,899,555, for example, discloses such an electrical card connector comprising an ejecting mechanism with half lock function. Said ejecting mechanism comprises a slider and a half-device disposed on the slider. The half-device includes a separate moveable piece and an elastic plate thereon, and the moveable piece includes a bulb. Said bulb inserts into an electrical card and is received by a recess of the electrical card to hold the electrical card in the electrical card connector. However, the electrical card connector needs to set another elastic plate to reach the half lock function. Therefore, the cost of the electrical card connector is quite high, and the assembly process is complex.

Hence, it is desirable to have an improved card connector to overcome the above-mentioned disadvantages of the prior art.

BRIEF SUMMARY OF THE INVENTION

Accordingly, the object of the present invention is to provide an electrical card connector having a lock device.

In order to achieve the above-mentioned object, an electrical card connector for receiving an electrical card comprises an insulative housing; a plurality of terminals received in the insulative housing; a shell covering the insulative housing; a receiving space defined by the insulative housing and the shell; and an ejecting mechanism assembled on one side of the insulative housing, comprising a slider and a lock device located at the slider approaching to the receiving space, the lock device comprising a lock member with two flexible arms arranged in step and connecting to the slider in a front-to-rear direction.

Other objects, advantages and novel features of the invention will become more apparent from the following detailed description of the present embodiment when taken in conjunction with the accompanying drawings.

DETAILED DESCRIPTION OF THE INVENTION

Figure 1:
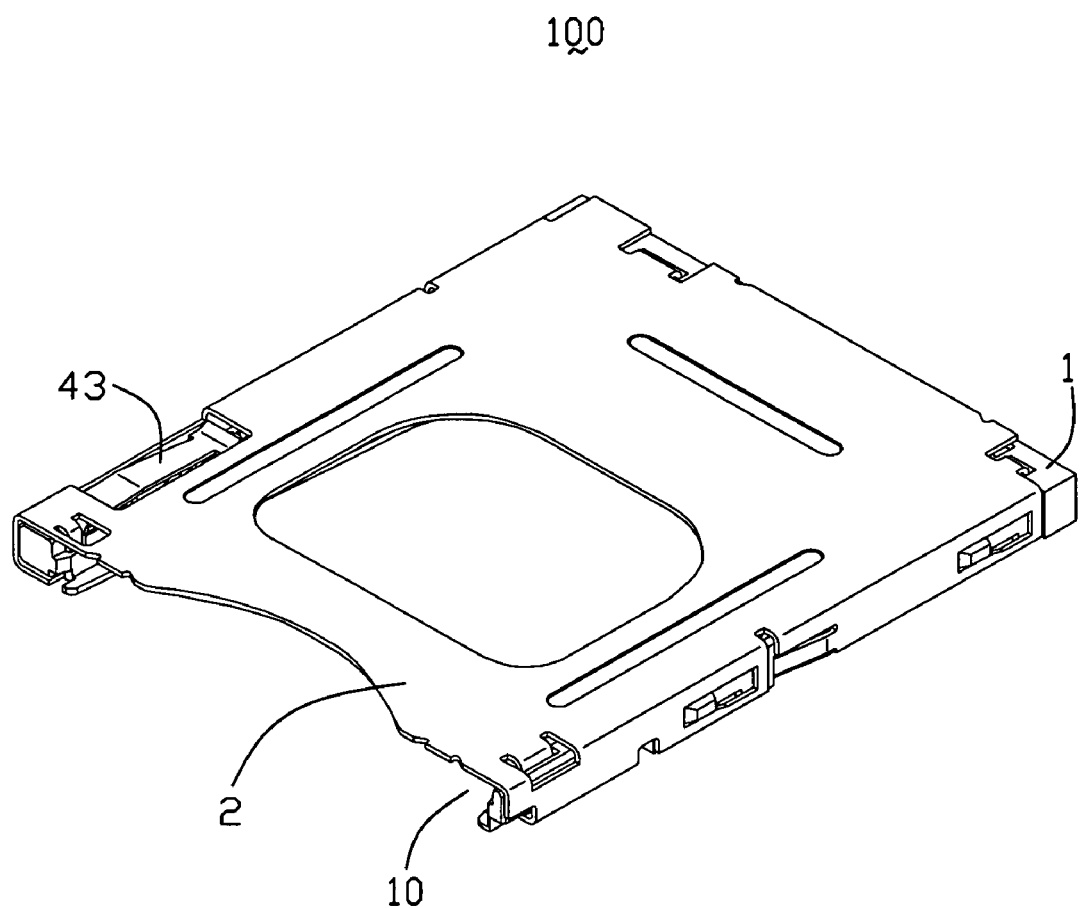
FIG. 1 is a perspective view of an electrical card connector in accordance with the present invention.

Reference will now be made to the drawing figures to describe the present invention in detail.

Figure 2:
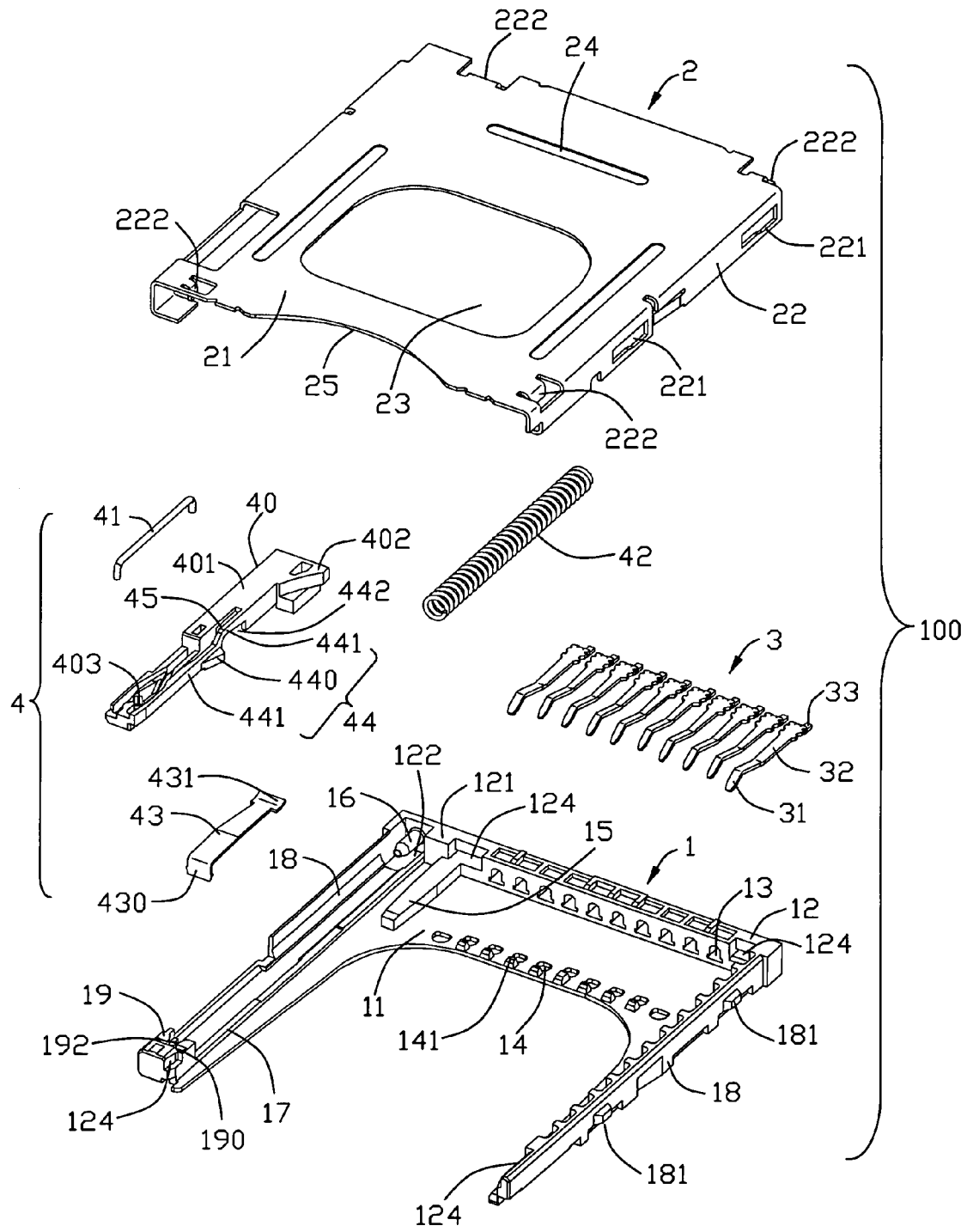
FIG. 2 is an exploded, perspective view of the electrical card connector shown in FIG. 1.
Figure 5:
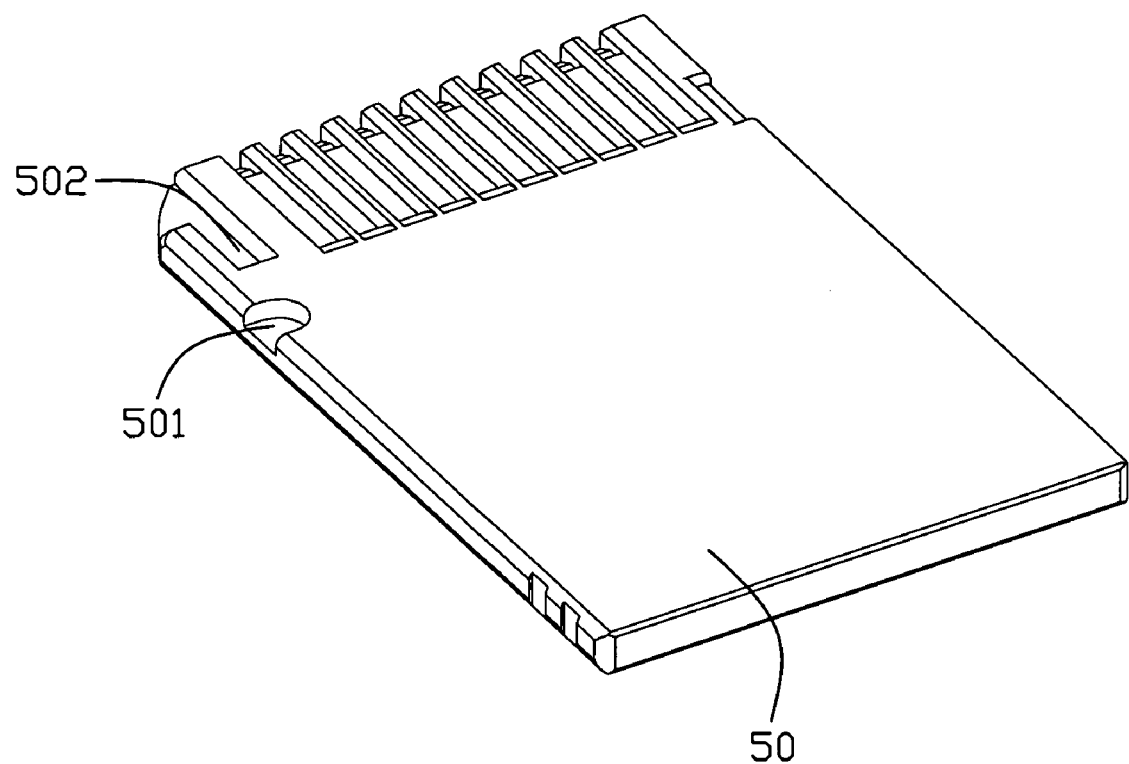
FIG. 5 is a perspective view of an electrical card.

Referring to FIG. 1 and FIG. 2, an electrical connector 100 for receiving an electrical card 50 (shown in FIG. 5) comprises an insulative housing 1, a plurality of terminals 3 receiving in the insulative housing 1, a shell 2 covering the insulative housing 1, an ejecting mechanism 4 assembled on one side of the insulative housing 1 and a receiving space 10 defined by the insulative housing 1 and the shell 2. The electrical card 50 comprises a recess 502 in the front of the card 50, and a gap 501 is disposed in the one side of the card 50.

Referring to FIG. 2, the insulative housing 1 approximately assumes an U-shape and comprises a low wall 11, a front wall 12 extending from the low wall 11 frontwardly, and a pair of lateral walls 18 located at opposite sides of the low wall 11. The front wall 12 comprises a plurality of terminal receiving passageways 13 and a stopping wall 121 approaching to the left lateral wall 18. A space 122 is defined between the stopping wall 121 and the left lateral wall 18, and a guide post 16 extends backwardly to the space 122 from the front wall 12. The low wall 11 of the insulative housing 1 continually arranges an emboss 19 approaching to the left lateral wall 18 but far away from the front wall 12. The emboss 19 includes a retaining slot 190 in the front thereof and a hole 192 defined on the top surface of the emboss 19. Additionally, the low wall 11 arranges a plurality of through-holes 14 thereof corresponding to the terminals 3. A plurality of blocks 141 are formed behind the through-holes 14 in a front-to-rear direction. The blocks 141 guide the electrical card 50 into the electrical card connector 100 and prevent the terminals 3 from destroying. The front wall 12, nearing to the stopping wall 121, arranges a rib 15 extending into the receiving space 10 in the front-to-rear direction, and the rib 15 mates with the recess 502 of the electrical card 50 for guiding the electrical card 50 into the electrical connector 100 correctly. The low wall 11 comprises a guide rail 17 extending into the space 122. A plurality of bulges 181 are formed on the lateral wall 12. A pair of holding faces 124 are formed on two inside of the front wall 12, right side of the emboss 19 and adjacent to right lateral wall 18, respectively.

Per terminal 3 comprises a contact portion 31, a retention portion 32 extending forwardly from the contact portion 31 and a solder portion 33 for jointing the terminal 3 to Printed Circuit Board (PCB) (not shown). Each retention portion 32 of the terminal 3 is received in corresponding terminal receiving passageway 13. The contact portion 31, above the through-holes 14, extends into the receiving space 10. When the electrical card 50 inserts into the receiving space 10, the terminals 3 can bend into corresponding through-holes 14 to prevent the terminal 3 from distortion for pressing it repeatedly.

Referring to FIG. 2, the shell 2, made by a metal plate, comprises a main portion 21 and a pair of lateral portions 22 extending downwardly from two lateral sides of the main portion 21. The main portion 21 assumes an arcuation 25 in front thereof. A square hole 23 is defined at the middle of the main portion 21, and a plurality of caves 24 round it. In the front of the main portion 21, there are two vertical pieces 222 extending downwardly from two sides, respectively. The shell 2 is assembled to the insulative housing 1 in a rear-tofront direction, and the vertical pieces 222 are held by the holding faces 124 of the insulative housing 1. The left lateral portion 22 bends inward for receiving the emboss 19. Each lateral portion 22 further comprises a plurality of deduction holes 221 for mating with corresponding bulges 181 of the insulative housing 1.

Referring to FIG. 2 to FIG. 5, the ejecting mechanism 4 is disposed on the inner side of the lateral wall 18, and comprises a slider 40, an ejecting arm 402, a cam follower 41, an spring element 42 and an elastic piece 43. The slider 40 is movably received in the guide rail 17 of the insulative housing 1 along the front-to-rear direction. The slider 40 comprises a base portion 401, a lock device 44 approaching to the receiving space 10 and a rear portion (not labeled) with a heart groove 403 extending from the base portion 401 backwardly. The rear portion is lower than the base portion 401 to reduce the height of the electrical card connector 100. The lock device 44 comprises a lock member 440 connecting to the slider 40 in the front-to-rear direction by two flexible arms 441, and said two flexible arms 441 assume step-shaped distribution. The front flexible arm 441 connecting to the base portion 401 defines an inner space 442 at the bottom thereof. A slot 45 with a certain width is defined between the flexible arms 441 and the slider 40. The lock member 440 inserts into the gap 501 of the electrical card 50 for holding the electrical card 50 on the slider 40. The cam follower 41 is made through a metal bar with two ends thereof bending downwardly. One end of the cam follower 41 is held by the hole 192 of the emboss 19, and the other end of the cam follower 41 moves along the heart groove 403. The spring element 42 is arranged between the slider 40 and the front wall 12 of the insulative housing 1. One end of the spring element 42 is disposed on the guide post 16, and the other end is disposed on the slider 40. The spring element 42 partially extends into the inner space 442 of the flexible arm 441. In present invention, the spring element 42 is a spring. The elastic piece 43 comprises a holding member 430 and a cantilever 431 extending from the holding member 430 forwardly. The holding member 430 inserts into and is retained in the retaining slot 190 of the insulative housing 1. The cantilever 431 presses on the top surface of the cam follower 41 to keep the cam follower 41 retaining in the heart groove 403.

Figure 3:
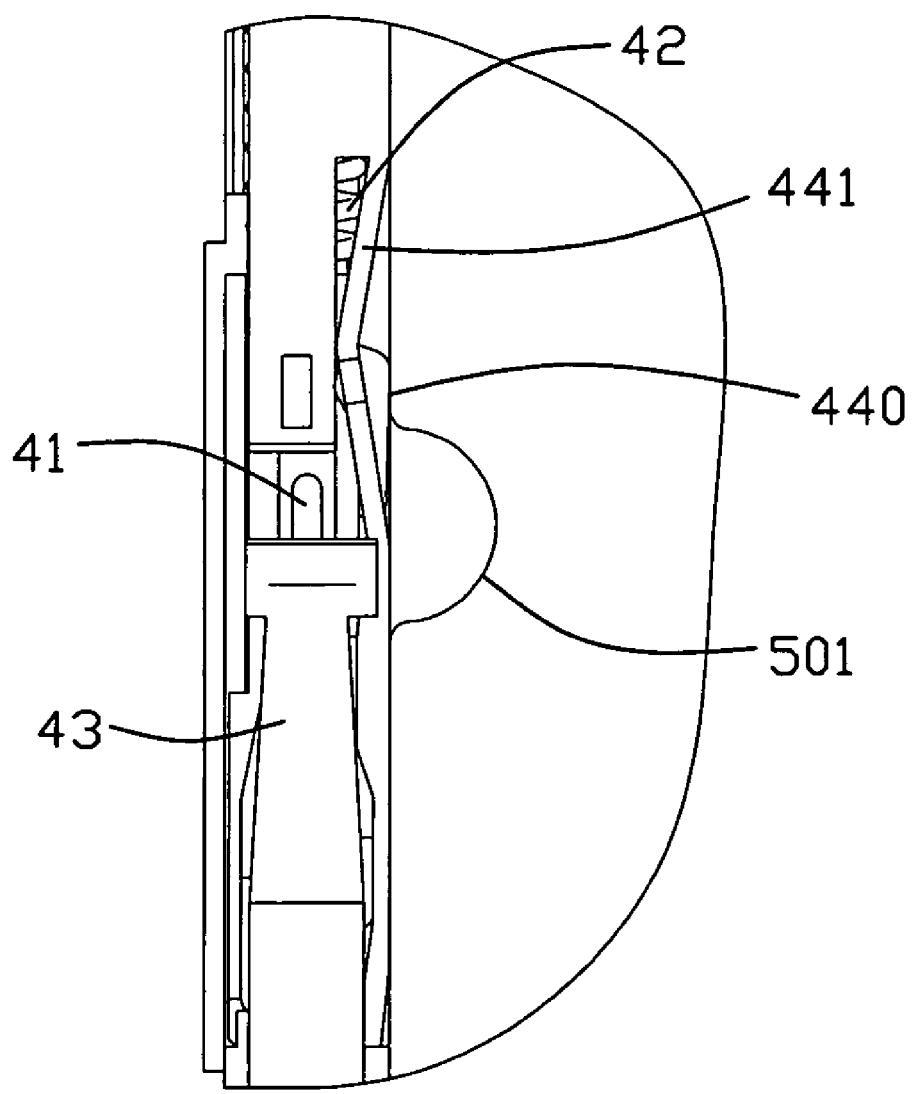
FIG. 3 is an enlarged view of a half lock device in a releasing state.
Figure 4:
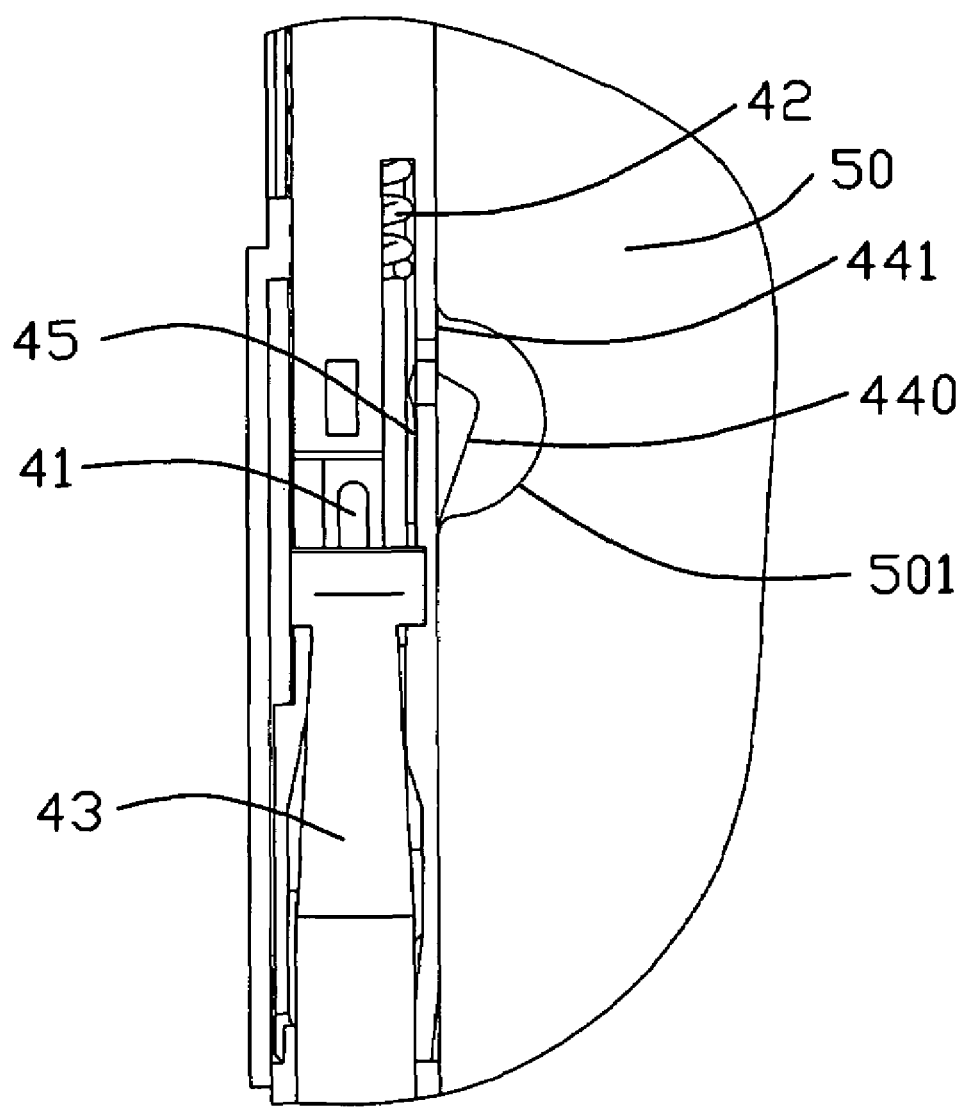
FIG. 4 is an enlarged view of a half lock device in a locking state.

Referring to FIG. 1 to FIG. 4, when the electrical card 50 inserts into the electrical card connector 100, the lock device 44 will be pressed into the slot 45 by the pressure of the electrical card 50 (shown in FIG. 3). When the front portion of the electrical card 50 touches the ejecting arm 402, the lock member 440 of the slider 40 enters into the gap 501 of the electrical card 50 (shown in FIG. 4). And then, the electrical card 50 pushes the slider 40 moving forwardly, continuously. The cam follower 41 moves along the heart groove 403 subject to the slider 40. The spring element 42 is compressed for the pressure of the slider 40. After the electrical card 50 inserting into the electrical card connector 100 completely, the terminals 3 connect to the electrical card 50 electrically. For the cam follower 41 cooperating with the heart groove 403, the electrical card 50 and the slider 40 are held in the card-reading position steadily. When the user wants to eject the electrical card 50, he/she just pushes the electrical card 50 forwardly again, the cam follower 41 are released from the heart groove 403, and the pressure of the spring element 42 helps the slider 40 moving backwardly for ejecting the electrical card 50 from the electrical card connector 100.

The two flexible arms 441 can enhance the strength of the lock member 440. The lock device 44 and the slider 40 are molded together to reduce the cost of the electrical card connector 100, and the assembly process of the lock device 44 is simple. In addition, with two flexible arms 441 controllably linked at two sides, the locking member 440 assures its constant height after deflection.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector for receiving an electrical card, comprising:
   an insulative housing;
   a plurality of terminals received in the insulative housing;
   a shell covering the insulative housing;
   a receiving space defined by the insulative housing and the shell; and
   an ejecting mechanism assembled on one side of the insulative housing, the ejecting mechanism comprising a slider and a lock device connected to the slider and exposed to the receiving space, the lock device comprising a lock member and two flexible arms arranged in step and connecting to the slider in a front-to-rear direction.

2. The electrical card connector as claimed in claim 1, wherein the slider comprises a base portion and a rear portion with a heart groove extending from the base portion backwardly, the rear portion being lower than the base portion.

3. The electrical card connector as claimed in claim 1, wherein a slot is defined between the flexible arms and the slider.

4. The electrical card connector as claimed in claim 2, wherein one of the flexible arms connects to the base portion and the other flexible arm connects to the rear portion, and the flexible arm connecting to the base portion defines an inner space at a bottom thereof.

5. The electrical card connector as claimed in claim 1, wherein the flexible arms are resilient.

6. The electrical card connector as claimed in claim 5, wherein the ejecting mechanism comprises a spring element, the spring element partially extending into the inner space of the flexible arm.

7. The electrical card connector as claimed in claim 1, wherein the insulative housing approximately assumes an U-shape and comprises a low wall, a front wall extending from the low wall forwardly and a pair of lateral walls located at both sides of the low wall, and the ejecting mechanism is disposed on the inner side of the lateral wall.

8. The electrical card connector as claimed in claim 7, wherein the front wall comprises a rib extending into the receiving space in the front-to-rear direction for mating with a recess of an electrical connector.

9. The electrical card connector as claimed in claim 8, wherein the low wall comprises a plurality of through-holes corresponding to the terminals, and each terminal comprises a contact portion located above a corresponding through-hole.

10. The electrical card connector as claimed in claim 9, wherein a plurality of blocks are formed rearwardly of the through-holes in the front-to-rear direction.

11. The electrical card connector as claimed in claim 10, wherein the front wall forms a rear stopping wall, and a space is defined between the stopping wall and one lateral wall.

12. An electrical card connector comprising:
an insulative housing defining a card receiving space thereon;
a plurality of contacts disposed in the housing and extending into the card receiving space;
a slider back and forth moveable relative to the housing along a card insertion direction;
a spring urging said slider in a card ejection direction opposite to said card insertion direction;
a locking device having two opposite stationary ends linked to an outside edge of the slider with there between a locking head, for locking into a notch of an inserted card, extending into the card receiving space in a deflectable manner.

13. The electrical card connector as claimed in claim 12, wherein said two deflectable arms are located between said two opposite ends and the locking head.

14. The electrical card connector as claimed in claim 13, wherein one of said two deflectable arms is higher than the other.

* * * * *